United States Patent
Koop et al.

(10) Patent No.: US 6,457,854 B1
(45) Date of Patent: Oct. 1, 2002

(54) MICROMIXER

(75) Inventors: Ulrich Koop, Rossdorf; Michael Schmelz, Kriftel; Andreas Beirau, Darmstadt, all of (DE)

(73) Assignee: Merck Patent Gesellschaft mit, Darmstadt (DE)

(*) Notice: Subject to any disclaimer, the term of this patent is extended or adjusted under 35 U.S.C. 154(b) by 0 days.

(21) Appl. No.: 09/529,970

(22) PCT Filed: Oct. 12, 1998

(86) PCT No.: PCT/EP98/06462
§ 371 (c)(1),
(2), (4) Date: Apr. 24, 2000

(87) PCT Pub. No.: WO99/20379
PCT Pub. Date: Apr. 29, 1999

(30) Foreign Application Priority Data

Oct. 22, 1997 (DE) .......................................... 197 46 583

(51) Int. Cl.⁷ ................................................ B01F 15/00
(52) U.S. Cl. ...................................... 366/336; 366/349
(58) Field of Search .................................. 366/336, 338, 366/339, 340, 341, 349

(56) References Cited

U.S. PATENT DOCUMENTS

| | | | | |
|---|---|---|---|---|
| 3,159,312 A | * | 12/1964 | Van Sciver, II | 366/336 |
| 3,394,924 A | * | 7/1968 | Harder | 366/338 |
| 3,459,407 A | * | 8/1969 | Hazlehurst et al. | 366/338 |
| 3,476,521 A | * | 11/1969 | Wise | |
| 3,770,249 A | * | 11/1973 | Schmitt | |
| 3,852,013 A | * | 12/1974 | Upmeier | |
| 3,924,989 A | * | 12/1975 | Althusen et al. | |
| 3,927,868 A | * | 12/1975 | Moore | |
| 4,087,862 A | * | 5/1978 | Tsien | |
| 4,316,673 A | * | 2/1982 | Spear | |
| 4,432,651 A | * | 2/1984 | McLeod | |
| 4,534,659 A | * | 8/1985 | Dourdeville et al. | |
| 5,137,369 A | * | 8/1992 | Hodan | |
| 5,531,831 A | * | 7/1996 | Sweeney et al. | 366/337 |
| 5,595,712 A | * | 1/1997 | Harbster et al. | 366/339 |
| 5,826,981 A | * | 10/1998 | Fowler et al. | 366/336 |
| 6,082,891 A | * | 7/2000 | Schubert et al. | |
| 6,190,034 B1 | * | 2/2001 | Nielsen et al. | 366/336 |
| 6,367,964 B1 | * | 4/2002 | Schmelz et al. | 366/336 |

FOREIGN PATENT DOCUMENTS

| | | |
|---|---|---|
| DE | 19511603 | 10/1996 |
| DE | 19540292 | 10/1996 |
| DE | 19541265 | 5/1997 |
| WO | WO96 03206 | 2/1996 |

* cited by examiner

*Primary Examiner*—Tony G. Soohoo
(74) *Attorney, Agent, or Firm*—Millen, White, Zelano & Branigan, P.C.

(57) ABSTRACT

The inventive micromixer for mixing liquid, viscous or gaseous phases has a housing bottom part (2) and a housing top part (3) which lie closely against each other via connecting surfaces (6, 7). Two delivery channels (1a, 1b) and an outlet channel (5) open out into the dividing surface between the two connecting surface (6, 7). Channel grooves (9, 10) which cross each other several times are formed in one connecting surfaces (6) and provide a mixing section for the phases being mixed.

8 Claims, 3 Drawing Sheets

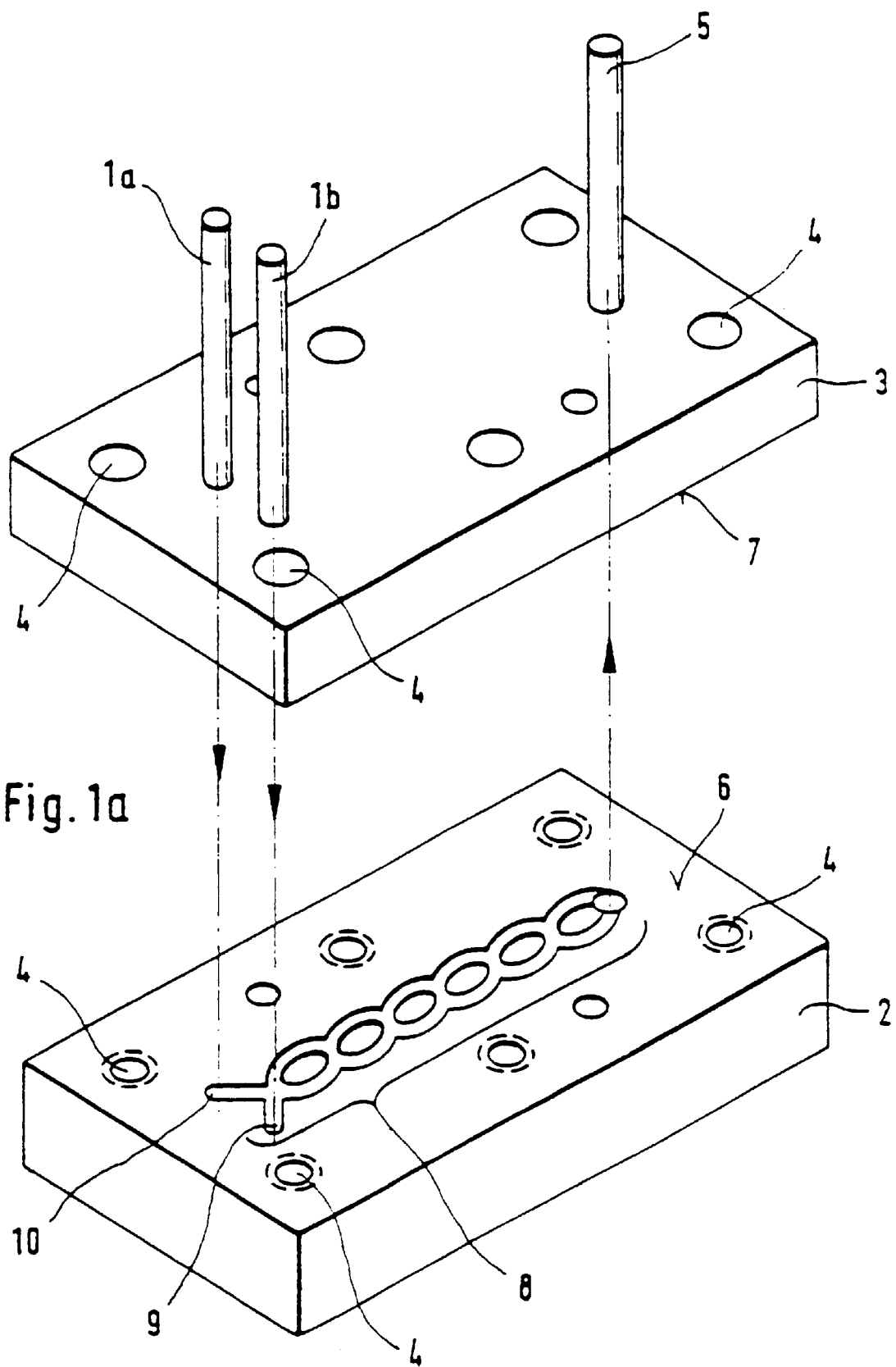

MICROMIXER

Figure 1:
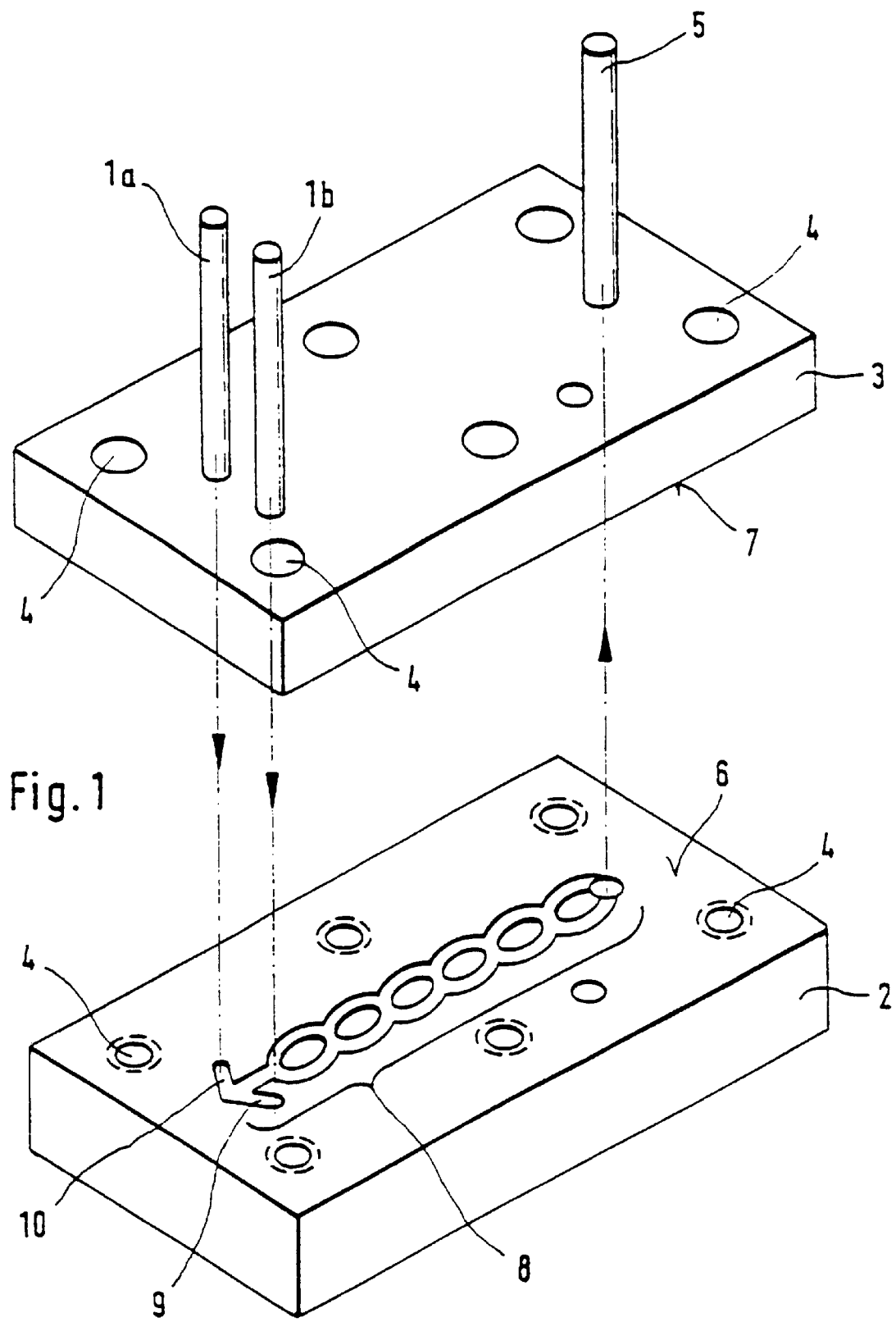

The invention relates to a micromixer for mixing at least two liquid, viscous or gaseous phases, having one inlet passage for each of the phases, a mixing section, in which the phase flows are crossed and divided one or more times, and an outlet passage for the mixture.

Various embodiments of devices for mixing liquid, viscous or gaseous phases are known. The operating principle of these mixers consists in dividing and crossing the two or more phase flows which are to be mixed with one another a number of times, so that an intensively mixed flow of substance is formed at the end of the mixing section. To mix small quantities it is known, for example, to form the mixing section in a thin tube which contains mixing bodies which guide the two phases which are to be mixed in passages which cross one another. However, such tubular mixing sections are less suitable if it is necessary to mix particularly small quantities and, for example, exact temperature control is required.

Therefore, the object of the invention is to design a micromixer of the generic type described in the introduction in such a way that, with little manufacturing outlay, it is possible to construct a mixing section which has a very small receiving volume and allows exact and uniform temperature control in all areas. Moreover, the micromixer is to be easy to clean and is to offer the option of using a very wide range of materials, so that it can be adapted to a very wide range of possible applications.

According to the invention, this object is achieved by the fact that a housing bottom part and a housing top part bear against one another in a sealed manner on connecting surfaces which face towards one another, that the inlet passages and the outlet passage open out into the parting face formed by the connecting surfaces, and that passage grooves, which form the mixing section, are recessed in at least one of the two connecting surfaces.

Since the mixing section comprises exclusively those surfaces of the housing parts which face towards one another and the passage grooves which are recessed therein, there is no need to provide separate mixing bodies. The passage grooves which are recessed in at least one of the two connecting surfaces can be made in any desired surface structure, cross-sectional design and profile adapted to the particular application, using precision-machining processes. Since the machining takes place only in the immediate vicinity of the surface, the manufacturing outlay required for this purpose is relatively low.

The simple, substantially plate-like structure of the two housing parts and, if appropriate, further intermediate housing plates which are arranged between these parts and each have a connecting surface on both sides makes it possible to use a very wide range of materials, the selection of materials as far as possible depending only on the requirements of the substances to be mixed, since manufacturing engineering considerations largely fade into the background.

The seal between the contact surfaces which bear against one another is effected by means of compressive forces, specifically by the precision-machined surfaces and/or seals, for example O-ring seals or flat gaskets, being pressed together. After the micromixer has been opened, all the areas which have come into contact with the substances to be mixed can be cleaned in a simple manner.

Since all the areas of the passages which cross one another in the mixing section as well as any connection grooves are formed in a uniform manner in the connecting surface, the heat transfer conditions in all the passage sections are also entirely uniform. Therefore, completely uniform temperature control can be established in all sections of the passages in the micromixer simply by regulating the temperature of the housing parts. The very small cross section of the channel grooves results in a very high ratio of the passage surface areas to the passage volume, allowing very satisfactory heat exchange to be achieved. This also contributes to increasing the operating reliability and enables exact temperature control.

Preferably, the passage grooves are recessed in only one of the two connecting surfaces which bear against one another. Alternatively, however, it is also possible to recess passage grooves in both connecting surfaces.

According to a preferred embodiment of the invention, the mixing section comprises two passage grooves which run in the form of a wave and cross one another a number of times. This shape of groove is particularly simple to manufacture and results in a substantially equal passage cross section in all areas of the passage, so that there are also constant conditions of heat transfer to the housing parts in all areas. Intensive mixing is achieved in a very small space and with a comparatively short passage length.

Further advantageous configurations of the inventive idea form the subject matter of further subclaims.

Exemplary embodiments of the invention are explained in more detail below and are illustrated in the drawing, in which:

FIG. 1 shows a three-dimensional, exploded view of a micromixer comprising a housing bottom part and a housing top part, with the connecting screws omitted, FIG. 1a shows a particular embodiment of the housing bottom part, in which the passage grooves adjoining the inlet passages 1a and 1b join one another in a V shape, the point of the V facing in the opposite direction to the passage grooves running in the form of a wave.

Figure 2:
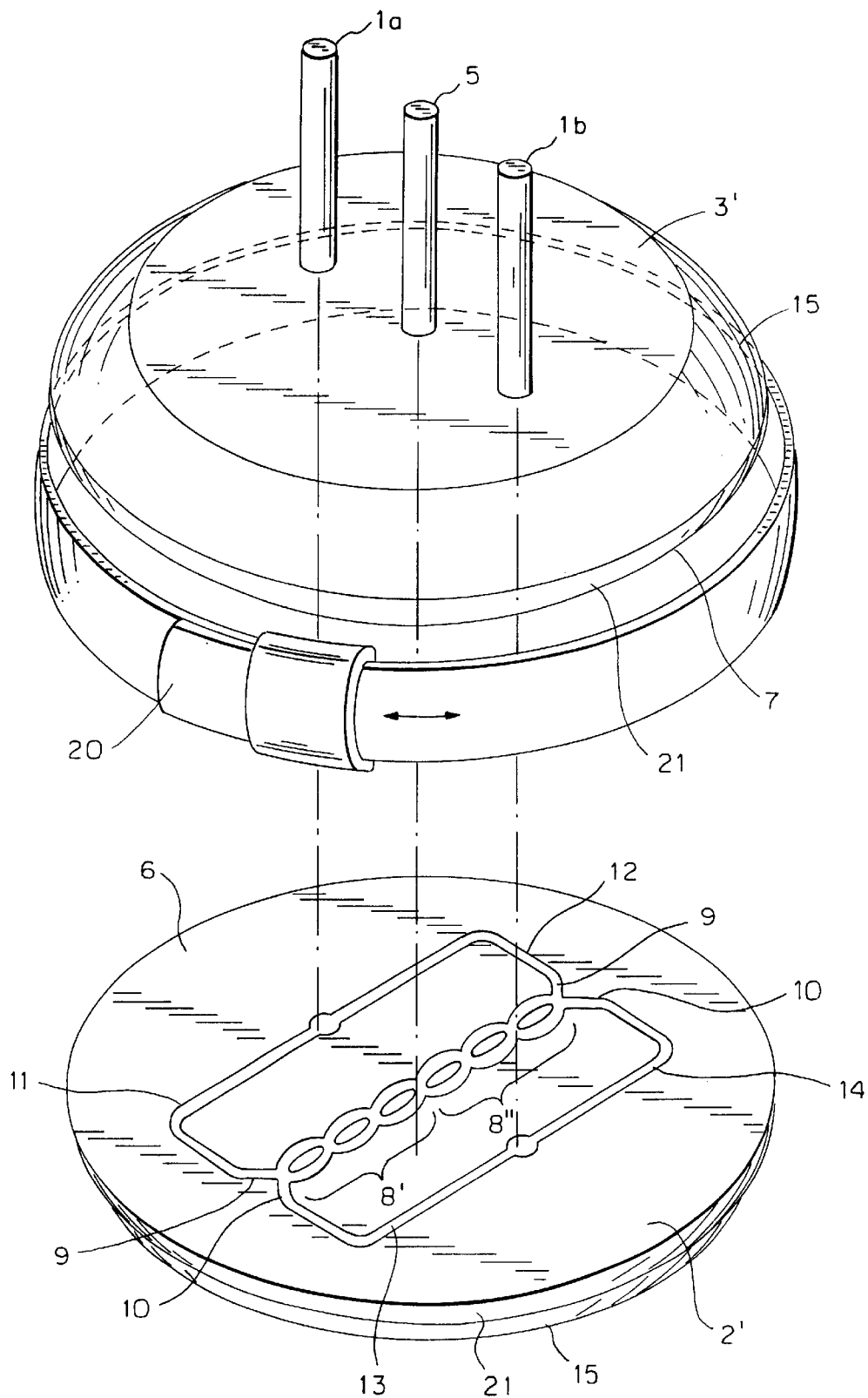

FIG. 2 shows a similar illustration to that of FIG. 1 of a modified embodiment of a micromixer.

The micromixer shown in FIGS. 1 and 1a is used to mix two liquid, viscous or gaseous phases which are supplied via two inlet passages 1a, 1b which are only diagrammatically depicted. The micromixer has a housing bottom part 2 and a housing top part 3 which, in the exemplary embodiments illustrated, are designed as simple rectangular plates. In the assembled state, the housing bottom part is connected to the housing top part by means of screws, which are not shown and extend through drilled holes 4.

An outlet passage 5, which removes the mixed phase, leads out of the micromixer.

In the assembled state, the housing bottom part 2 and the housing top part 3 bear directly against one another in a sealed manner on mutually facing connecting surfaces 6 and 7, respectively. A mixing section 8 is formed in the connection surface 6 of the housing bottom part between the inlet passages 1a, 1b and the outlet passage 5. The mixing section 8 comprises two sinusoidal passage grooves 9 and 10 which are recessed in the connecting surface 6, run in the form of a wave and cross one another a number of times to form the mixing section 8. As a result, in the exemplary embodiments shown in FIG. 1 and FIG. 1a, the two phase flows supplied through the inlet passages 1a, 1b cross one another and are divided a number of times and are thus intensively mixed with one another. In particular embodiments, the passage grooves shown in the housing bottom part 2 and adjoining the inlet passages 1a and 1b may be Y-shaped, T-shaped or V-shaped, the point of the V facing in the opposite direction to the passage grooves running in the form of a wave. One of these particular embodiments is shown in FIG. 1a. The inlet passages 1a and 1b and the outlet passage 5 open into the parting face formed by abutment of the surfaces 6 and 7 and pass laterally through the parting face.

The two inlet passages 1a, 1b each open out at one end of the two wavy passage grooves 9 and 10.

The exemplary embodiment shown in FIG. 2 differs from the exemplary embodiment shown in FIG. 1 essentially through the fact that the two inlet passages 1a, 1b are each connected to both ends of one of the wavy passage grooves 9 or 10, which form the mixing section, via connecting grooves 11, 12 or 13, 14, respectively. The outlet passage 5 is connected in a central area of the passage grooves 9, 10 which cross one another. As a result, two mixing sections 8' and 8", which are connected in parallel, are formed.

In the exemplary embodiment shown in FIG. 2, the housing bottom part 2' and the housing top part 3' are designed in the form of a circular disc and are provided at their outer edge with a chamfer 15 which enables the two housing parts 2' and 3' to be connected to one another by means of a flanged connecting element 20 which acts on the edge 21, for example a clamping ring.

The structure of the two micromixers illustrated by way of example can be extended further by arranging one or more intermediate housing plates between the housing bottom part 2 or 2' and the housing top part 3 or 3', which intermediate plates have a connecting surface on both sides. This makes it possible to construct a multistage mixer.

In addition to the mixing sections 8, 8' and 8" described, heat exchangers, pumps and/or other process engineering components can be formed by means of recesses in the connecting surfaces 6, 7 and, if appropriate, the connecting surfaces of intermediate housing plates. By means of further plates and/or other forms of passage, it is also possible to integrate dwell and precooling sections whose temperature is precisely regulated in addition to heat exchangers and pumps.

In the exemplary embodiments illustrated, the housing parts are made from metal. As an alternative, it is also possible to use other materials, for example glass, plastics or ceramic. It is also possible to provide a surface coating, for example by vapour deposition, so that those surfaces which come into contact with the phases to be mixed can be selected in the particular material grade required.

What is claimed is:

1. A micromixer for mixing at least two liquid, viscous or gaseous phases to produce a mixed product, the micromixer comprising:
   an inlet passage for each of the phases, a mixing section in which phase flows are crossed and divided a plurality of times, and an outlet passage for the mixed phase product wherein;
   a) a housing bottom part (2, 2') and a housing top part (3, 3') directly bearing against one another in a sealed manner on abutting surfaces (6, 7) which face towards one another and are detachably connected to one another by a releasable device exerting a compressive force thereagainst,
   b) the inlet passage (1a, 1b) for each phase and the outlet passage (5) opening into and passing laterally through a parting face formed by abutment of the connecting surfaces (6, 7), and
   c) a pair of sinusoidal passage grooves (9, 10) forming the mixing section (8, 8', 8") recessed in at least one of the two connecting surfaces (6, 7), the grooves being at the same level and intersecting one another a plurality of times.

2. A reusable micromixer according to claim 1, wherein the passage grooves (9, 10) are recessed in only one of the two connecting surfaces (6, 7) which bear against one another.

3. A reusable micromixer according to claim 1, wherein the two inlet passages (1a, 1b) are each connected to both ends of one of the sinusoidal passage grooves (9 or 10) via connecting grooves (11, 12, 13, 14), and wherein the outlet passage (5) is connected to a central area of the sinusoidal passage grooves (9, 10) which intersect.

4. A reusable micromixer according to claim 1, wherein the housing top part (3') and the housing bottom part (2') are connected to one another by a flanged connecting element which cooperates with peripheral edges of the parts (3' and 2').

5. A reusable micromixer according to claim 1 wherein the housing bottom part (2, 2') and the housing top part (3, 3') are made of metal.

6. A reusable micromixer according to claim 1 wherein the housing bottom part and housing top part are made of a material selected from the group consisting of glasses, plastics or ceramics.

7. A micromixer for mixing at least two liquid, viscous or gaseous phases to produce a mixed product, the micromixer comprising:
   an inlet passage for each of the phases, a mixing section in which phase flows are crossed and divided a plurality of times, and an outlet passage for the mixed phase product wherein;
   (a) a housing bottom part (2, 2'), a housing top part (3, 3') with an intermediate housing plate therebetween arranged in a sealed manner with abutting surfaces (6, 7) engaging the intermediate housing plate, the parts and plate being detachably connected to one another by a releasable device exerting a compressive force thereagainst,
   (b) the inlet passage (1a, 1b) for each phase and the outlet passage (5) opening into and passing laterally through a parting face formed by abutment of the connecting surfaces (6, 7) with the intermediate plate, and
   (c) a pair of sinusoidal passage grooves (9, 10) forming the mixing section (8, 8', 8") recessed in at least one of the two connecting surfaces (6, 7), the grooves being at the same level and intersecting one another a plurality of times.

8. A micromixer for mixing at least two liquid, viscous or gaseous phases to produce a mixed product, the micromixer comprising:
   an inlet passage for each of the phases, a mixing section in which phase flows are crossed and divided a plurality of times, and an outlet passage for the mixed phase product wherein;
   (a) a housing bottom part (2, 2') and a housing top part (3, 3') directly bearing against one another in a sealed manner on abutting surfaces (6, 7) which face towards one another and are detachably connected to one another by a releasable device exerting a compressive force thereagainst,
   (b) the inlet passage (1a, 1b) for each phase and the outlet passage (5) opening into and passing laterally through a parting face formed by abutment of the connecting surfaces (6, 7),
   (c) a pair of sinusoidal passage grooves (9, 10) forming the mixing section (8, 8', 8") recessed in at least one of the two connecting surfaces (6, 7), the grooves being at the same level and intersecting one another a plurality of times, and
   (d) heat exchangers, pumps or process engineering components formed by recesses in the connecting surfaces.

* * * * *